June 28, 1927.
T. DAVIS
1,633,982
RAT POISON HOLDER
Filed Feb. 18, 1927
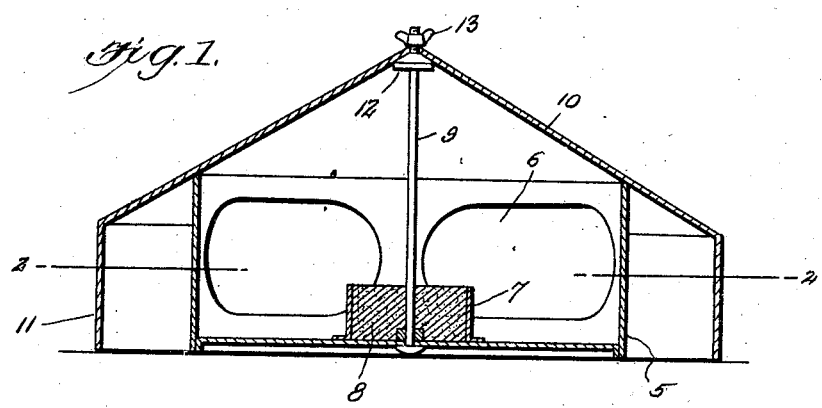
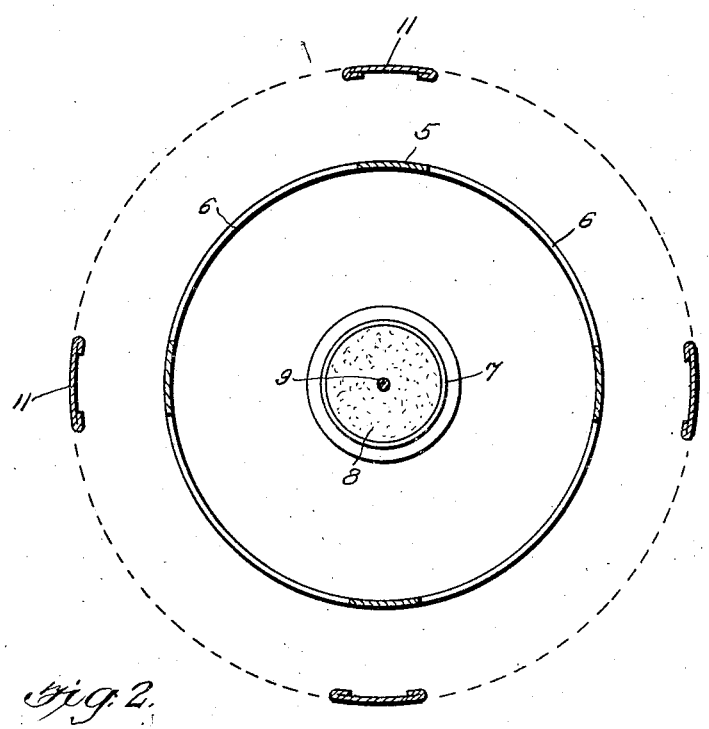
Inventor
Timon Davis,
By Clarence A O'Brien
Attorney Patented June 28, 1927.

1,633,982

UNITED STATES PATENT OFFICE.

TIMON DAVIS, OF MAUSTON, WISCONSIN.

RAT-POISON HOLDER.

Application filed February 18, 1927. Serial No. 169,382.

This invention relates to rat exterminating devices, and has more particular reference to a device constructed for the holding of a deadly poison which will at all times be accessible to rats or mice, but that will however prevent access to the poison by cats, dogs, or other pets.

A further and important object is to provide a holder of this character that is extremely simple of construction and inexpensive of manufacture, and one that is highly well adapted for all the purposes intended.

In the drawing wherein like reference characters indicate corresponding parts throughout both of the views:

Figure 1 is a detail section through a rat poison holder constructed in accordance with the present invention, and Figure 2 is a longitudinal section thereof taken substantially upon the line 2—2 of Figure 1.

Now having particular reference to the drawing, my novel device consists of a circular metallic pan 5 having oblong openings 6 throughout the circumference thereof preferably four in number as indicated in Figure 2. Fixed to the center of the bottom wall of this pan is a circular cup 7 within which is placed a cake of poison or other poisonous material 8, while extending through the bottom wall of the pan and the center of the circular cup 7, is an elongated bolt 9 headed at its lower end so as to prevent the displacement of the bolt in an upward direction.

Arranged over the top of this pan 5 is a conical lid 10, the edge of which considerably overlaps the edge of the pan and that is formed at said edge with depending integral legs 11 in equally spaced relation and being preferably four in number, again as indicated in Figure 2. These legs rest upon the floor surface and are disposed at points intermediate the openings 6 of the pan 5 so as to permit mice and rats to gain access to the interior of the pan through the legs and through said openings but by reason of their short height and relatively close relation cats, dogs, or other pets will be prevented from gaining access to the interior of the pan and the rodent exterminating poison.

The upper end of the bolt 9 is threaded and engages through the apex of the lid 10, while arranged upon the bolt directly beneath the lid apex is a conical nut 12 for supporting the center of the lid. Threaded upon the outer end of the bolt is a wing nut 13 in order that the lid 10 can be clamped firmly against the nut 12 and the upper edge of the pan 5.

It will thus be seen that I have provided a highly novel, simple, and efficient rat poison holder that is so well adapted for all the purposes heretofore designated, and even though I have herein shown and described the invention as consisting of certain detail structural elements, it is nevertheless to be understood that some changes may be made therein without affecting the spirit and scope of the appended claims.

Having thus described the invention, what I claim is:—

1. In a poison holder of the character described, a pan having spaced oblong openings at its sides, a poison holding cup arranged in the center of the pan, an inverted conical lid for disposition over the top of the pan and being of an area so that the edge of the lid will overlap the edge of the pan, spaced depending legs on the edge of the lid and resting upon the floor surface, and means interconnecting the center of the pan and the apex of said lid.

2. In a poison holder of the character described, a pan having spaced oblong openings at its sides, a poison holder within the pan, an inverted conical lid for disposition over the top of the pan and being of an area so that the edge of the lid will overlap the edge of the pan, spaced depending legs at the edge of the lid for resting upon the floor surface, means for interconnecting the center of the pan and the apex of said lid, said means consisting of an elongated bolt arranged through the center of the pan and the apex of the lid, a conical button upon the rod directly beneath the lid apex, and a nut threaded upon the projecting end of the bolt.

In testimony whereof I affix my signature.

TIMON DAVIS.